(12) United States Patent
Burton et al.

(10) Patent No.: US 7,966,713 B2
(45) Date of Patent: Jun. 28, 2011

(54) TOOLING HEAD MOUNTED STRUCTURAL POSITIONING

(75) Inventors: Kurt A. Burton, Wildwood, MO (US); Michael P. Matlack, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1327 days.

(21) Appl. No.: 11/383,840

(22) Filed: May 17, 2006

(65) Prior Publication Data
US 2007/0266536 A1 Nov. 22, 2007

(51) Int. Cl.
*B23Q 7/00* (2006.01)
*B23K 37/02* (2006.01)
*B23P 11/00* (2006.01)

(52) U.S. Cl. ............ 29/559; 29/56.6; 29/721; 29/281.4; 29/281.1; 228/32; 228/45; 228/44.3

(58) Field of Classification Search ............ 29/559, 29/561, 562, 56.5, 56.6, 721, 281.1, 281.4, 29/281.5, 281.6; 228/32, 45, 44.3
See application file for complete search history.

(56) References Cited

U.S. PATENT DOCUMENTS

| | | | | |
|---|---|---|---|---|
| 2,676,624 A | | 4/1954 | Gecmen | |
| 2,737,565 A | * | 3/1956 | Meyer | 219/126 |
| 3,391,267 A | * | 7/1968 | Rudd | 219/102 |
| 3,627,436 A | * | 12/1971 | Adams et al. | 408/63 |
| RE28,121 E | * | 8/1974 | Gulley | 173/32 |
| 3,870,853 A | * | 3/1975 | Reinhardt et al. | 219/124.31 |
| 3,937,918 A | * | 2/1976 | Robertson | 219/124.31 |
| 4,205,774 A | * | 6/1980 | Madden et al. | 228/32 |
| 4,244,104 A | | 1/1981 | Grube | |
| 4,268,196 A | * | 5/1981 | Harrow et al. | 408/39 |
| 4,599,018 A | * | 7/1986 | Woods | 408/1 R |
| 5,070,792 A | * | 12/1991 | Harris | 105/29.1 |
| 5,443,199 A | * | 8/1995 | Krumszyn et al. | 228/29 |
| 5,468,099 A | * | 11/1995 | Wheetley et al. | 408/1 R |
| 5,524,328 A | * | 6/1996 | Hardesty | 29/56.5 |
| 6,330,492 B1 | * | 12/2001 | Wisniewski et al. | 700/245 |
| 6,413,022 B1 | * | 7/2002 | Sarh | 408/76 |
| 6,419,142 B1 | * | 7/2002 | Larsson | 228/2.1 |
| 6,505,393 B2 | * | 1/2003 | Stoewer et al. | 29/525.06 |
| 6,519,825 B1 | * | 2/2003 | Lambert et al. | 29/281.1 |
| 6,719,184 B2 | * | 4/2004 | Ishida et al. | 228/112.1 |
| 6,742,696 B2 | * | 6/2004 | Thompson | 228/103 |
| 6,796,014 B2 | * | 9/2004 | Sarh | 29/407.09 |
| 6,843,328 B2 | * | 1/2005 | Boyl-Davis et al. | 173/32 |
| 6,855,099 B2 | * | 2/2005 | Hazlehurst et al. | 483/38 |
| 6,926,094 B2 | * | 8/2005 | Arntson et al. | 173/32 |
| 7,178,227 B2 | * | 2/2007 | Ghuman et al. | 29/799 |
| 7,219,408 B2 | * | 5/2007 | Jones et al. | 29/281.1 |
| 7,488,144 B2 | * | 2/2009 | Boyl-Davis et al. | 408/1 R |

(Continued)

FOREIGN PATENT DOCUMENTS

EP 0 314 954 A2 5/1989

(Continued)

*Primary Examiner* — Essama Omgba

(57) ABSTRACT

Embodiments of tool mounted structural positioning devices and techniques are described. In one embodiment, a positioning device includes mountings to mount the device directly to a tool device configured to travel a path and perform a manufacturing operation on an element. Engagement mechanisms coupled to the positioning device are aligned to the predefined path and are configured to exert a clamping force upon the element such that the element is secured and positioned by the positioning device in constant relation to the predefined path as the operations are performed.

17 Claims, 7 Drawing Sheets

U.S. PATENT DOCUMENTS

| | | | |
|---|---|---|---|
| 7,494,040 B2 * | 2/2009 | Babb et al. | 228/2.1 |
| 7,526,851 B1 * | 5/2009 | Boyl-Davis et al. | 29/559 |
| 7,537,150 B2 * | 5/2009 | Burton et al. | 228/2.1 |
| 7,617,965 B2 * | 11/2009 | Burton et al. | 228/112.1 |
| 2002/0168241 A1 * | 11/2002 | David et al. | 409/178 |
| 2002/0190101 A1 * | 12/2002 | Nelson et al. | 228/112.1 |
| 2003/0207742 A1 * | 11/2003 | Hazlehurst et al. | 483/36 |
| 2004/0234352 A1 * | 11/2004 | Vanderpol et al. | 409/178 |
| 2005/0045693 A1 * | 3/2005 | Buchheit et al. | 228/112.1 |
| 2005/0082342 A1 * | 4/2005 | Babb et al. | 228/112.1 |
| 2006/0102689 A1 * | 5/2006 | Trapp et al. | 228/2.1 |
| 2006/0168789 A1 * | 8/2006 | Sasahara | 29/281.1 |
| 2007/0101568 A1 * | 5/2007 | Doom | 29/559 |
| 2007/0187466 A1 * | 8/2007 | Sayama et al. | 228/101 |
| 2008/0000071 A1 * | 1/2008 | Chen et al. | 29/509 |
| 2008/0134485 A1 * | 6/2008 | Mayfield | 29/56.6 |
| 2009/0064835 A1 * | 3/2009 | Nien | 83/466 |
| 2009/0094828 A1 * | 4/2009 | Velez | 29/888.021 |
| 2009/0103910 A1 * | 4/2009 | Li et al. | 396/55 |
| 2009/0250505 A1 * | 10/2009 | Matlack et al. | 228/112.1 |
| 2010/0006622 A1 * | 1/2010 | Smith et al. | 228/2.1 |

FOREIGN PATENT DOCUMENTS

| | | |
|---|---|---|
| GB | 1163299 | 9/1969 |
| GB | 2 148 170 A | 5/1985 |
| GB | 2 216 460 A | 10/1989 |
| JP | 56102410 A | 8/1981 |
| JP | 58100748 A | 6/1983 |

* cited by examiner

TOOLING HEAD MOUNTED STRUCTURAL POSITIONING

FIELD OF THE INVENTION

This invention relates to devices and techniques for positioning and securing workpiece elements during a manufacturing operation, and more specifically, to tool-mounted structural positioning devices and techniques that may be used, for example, in welding, joining, or other manufacturing operations performed on multiple elements.

BACKGROUND OF THE INVENTION

During many different types of manufacturing operations, it is necessary to secure the elements being operated upon in a desired position relative to each other and/or the tools. In the case of computer controlled continuous tooling operations the elements are positioned and secured along the path of the tool as the tool head moves along the path. For example, in the process of friction stir welding, a high speed rotating spindle is utilized to engage elements, causing friction-induced elevated temperatures which fuse the elements together. This friction stir welding technique may be used to join structural elements together, for instance joining of cross-sectional T-shaped, L-shaped and/or angled supports (stringers) to a sheet aluminum structure (skins). In the process, the elements are positioned relative to each other and relative to the friction stir welding head in order that an acceptable joint is formed in the correct location. Other manufacturing operations, such as riveting, joining, punching, bending, crimping, application of adhesives and so forth, also typically involve positioning of the elements upon which the operations are being performed.

One traditional technique of securing and positioning an element is to use external tooling or holding elements (e.g., clamps and positioners external to the tool itself) to anchor elements in place and to maintain position from element to element, and from element to the tool. However, these external tooling techniques may be costly, may require significant time for set up and removal, and may be bulky and inconvenient to store when not in use Further, the axial and radial loading created during certain manufacturing operations may cause elements to slip when secured by external elements. In addition, the external holding elements may physically intersect and interfere with the desired toot path and accordingly may require stopping and starting of the particular manufacturing operation to remove and reposition the holding elements at various intervals. Thus, these traditional techniques of securing and positioning are cumbersome, difficult and time consuming to set-up, and ultimately may slow down and add cost to a manufacturing process.

SUMMARY OF THE INVENTION

Tool mounted structural positioning devices and techniques are described for securing and positioning a workpiece during a manufacturing operation. In one implementation a positioning device includes a main body member having a plurality of mountings to mount the positioning device directly to a tooling device. The tooling device is configured to perform a manufacturing operation while traveling along a predefined path, such as for joining a plurality of elements. Engagement mechanisms coupled to the main body member are aligned with the predefined path and operate to secure a first workpiece upon which the tooling device performs the operation, such that, when the tooling device moves along the predefined path, the positioning device aligns the first workpiece in constant relation to the predefined path.

BRIEF DESCRIPTION OF THE DRAWINGS

Embodiments of the present invention are according to detail below with reference to the following drawings.

DETAILED DESCRIPTION

The present invention relates to tool mounted structural positioning devices and techniques for securing elements during a manufacturing operation. Many specific details of certain embodiments of the invention are set forth in the following description and in FIGS. 1-7 to provide a thorough understanding of such embodiments. One skilled in the art, however, will understand that the present invention may have additional embodiments, or that the present invention may be practiced without several of the details according to the following description. For instance, while certain embodiments reference Friction Stir Welding (FSW) techniques, it may be appreciated by those of skill in the art that the structural positioning techniques described may be applied in a variety of tooling operations, a few examples of which are riveting, punching, gluing, scoring, bending, cutting, welding, and crimping.

Figure 1:
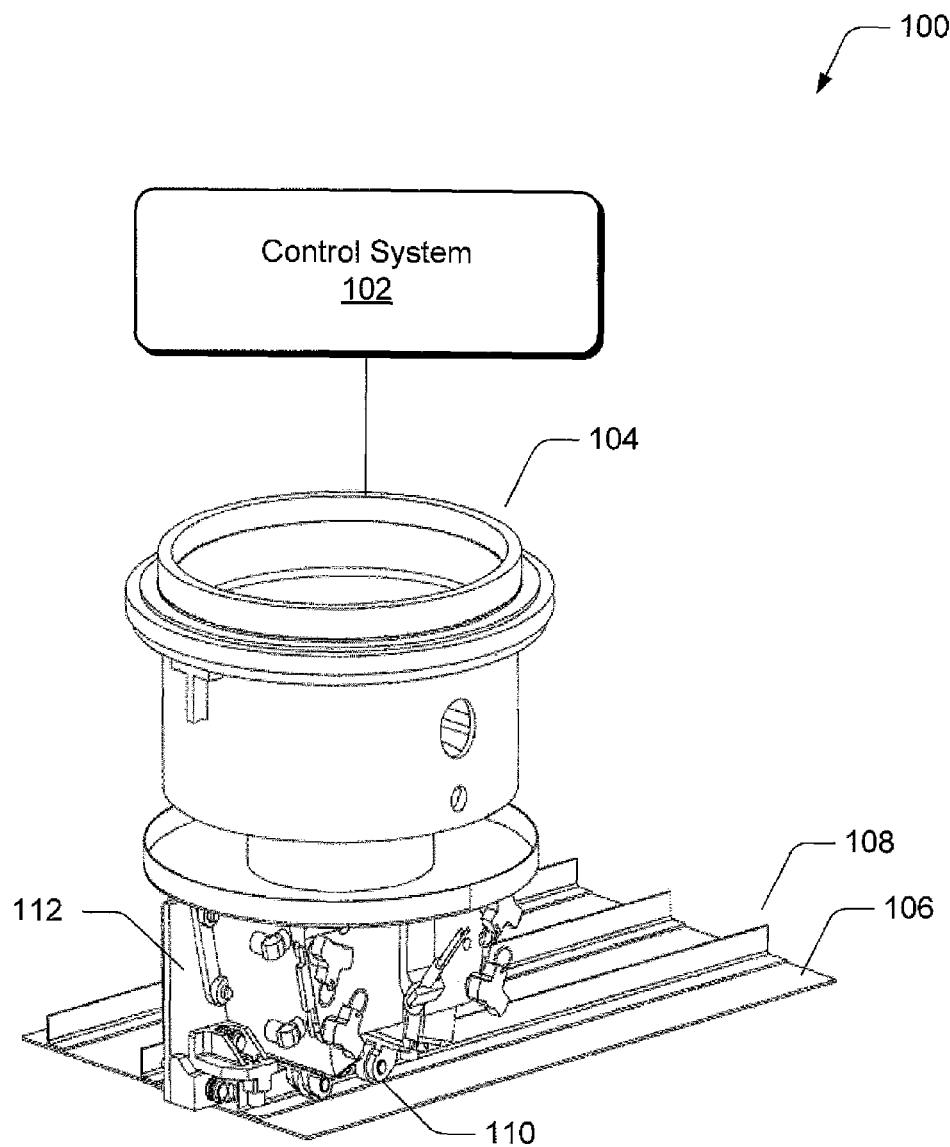
FIG. 1 illustrates a perspective view of components of a welding system formed in accordance with an embodiment of the present invention.

FIG. 1 illustrates a manufacturing system 100 in accordance with an embodiment of the present invention. In this embodiment, the manufacturing system 100 includes a control system 102 coupled communicatively and/or physically to a tooling device 104. The tooling device 104 is configured to perform manufacturing operations on various elements or workpieces. FIG. 1 further depicts a first workpiece 106 and a plurality of second workpieces 108.

The tooling device 104 is operable to perform operations on a number of workpieces or elements, for instance to produce a manufactured part or product. In one embodiment, the tooling device 104 is a welding component, such as a friction stir welding head or the like. In this embodiment, the tooling device 104 performs welding along one or more pre-defined paths to securely bond the first and second workpieces 106, 108 together. In alternate embodiments, any other desired manufacturing operations may be performed. While a single tooling device 104 is depicted in FIG. 1, it is contemplated that in alternate embodiments the system 100 may have a variety of tooling devices 104 which may operate independently or in combination. For instance, the system 100 may include a plurality of tooling devices 104 configured as friction stir welding heads, and arranged to perform independent or simultaneous welding of the plurality of second workpieces 108 to the first workpiece 106.

The control system 102 is representative of logic processing devices and the like, and is operable to control manufacturing operations described herein, and in particular, to control operation of the tooling device 104. For instance, the control system 102 may control movement and operation of the tooling device 104 along a predefined path, such as a path along which a weld or other operation is specified. In the depicted implementation, the tooling device 104 is depicted as connected to a plurality of axial rollers 110 which may facilitate movement of the tooling device 104 along a path, such as a specified weld path. The control system 102 may operate to control the speed, direction, and timing of movement, as well as the manufacturing operations of the tooling device(s) 104. Further, a multi-axis system may be employed wherein the roll, pitch, and yaw as well as forward/reverse and up/down motion of the tooling device 104 and assembly may be controlled. A variety of configurations of existing control systems and devices may be employed in accordance with the present disclosure, to cause the tooling device 104 to perform operations on workpieces (or elements) upon a predefined path.

As further shown in FIG. 1, the system 100 also includes at least one positioning device 112. The positioning device 112 is configured to secure the first and second workpieces 106, 108 and to maintain a relative relationship or position between elements and the tooling device 104 in the course of operations. For instance, the positioning device 112 may secure and position one of the second workpieces 108 being joined (e.g., welded) to the first workpiece 106 as the tooling device 104 traverses a path specified for the joint. As shown in FIG. 1, the positioning device 112 is mounted directly to the tooling device 104, and is configured to move along with the tooling device 104, such as along a predefined path controlled by the control system 102, or along a random (or non-predefined) path as directed by a user during a manufacturing operation.

The positioning device 112 is aligned with the tooling device 104 such that a specified positional relationship between the first and second workpieces 106, 108 and the tooling device 104 is maintained. In other words, the positioning device 112 is fixed relative to the tooling device 104, for instance, held in place by bolts or other suitable attachment means. Accordingly, securement and positioning of a workpiece, such as the second workpiece 108, may be accomplished via the positioning device 112 and without other external tooling devices or holding elements (e.g., clamps, positioners, fasteners and so forth) applied to the second workpiece 108. The positioning device 112 may employ a variety of techniques to secure and position workpieces, certain illustrative examples and aspects of which are detailed in the following discussion of FIGS. 2-6.

Figure 2:
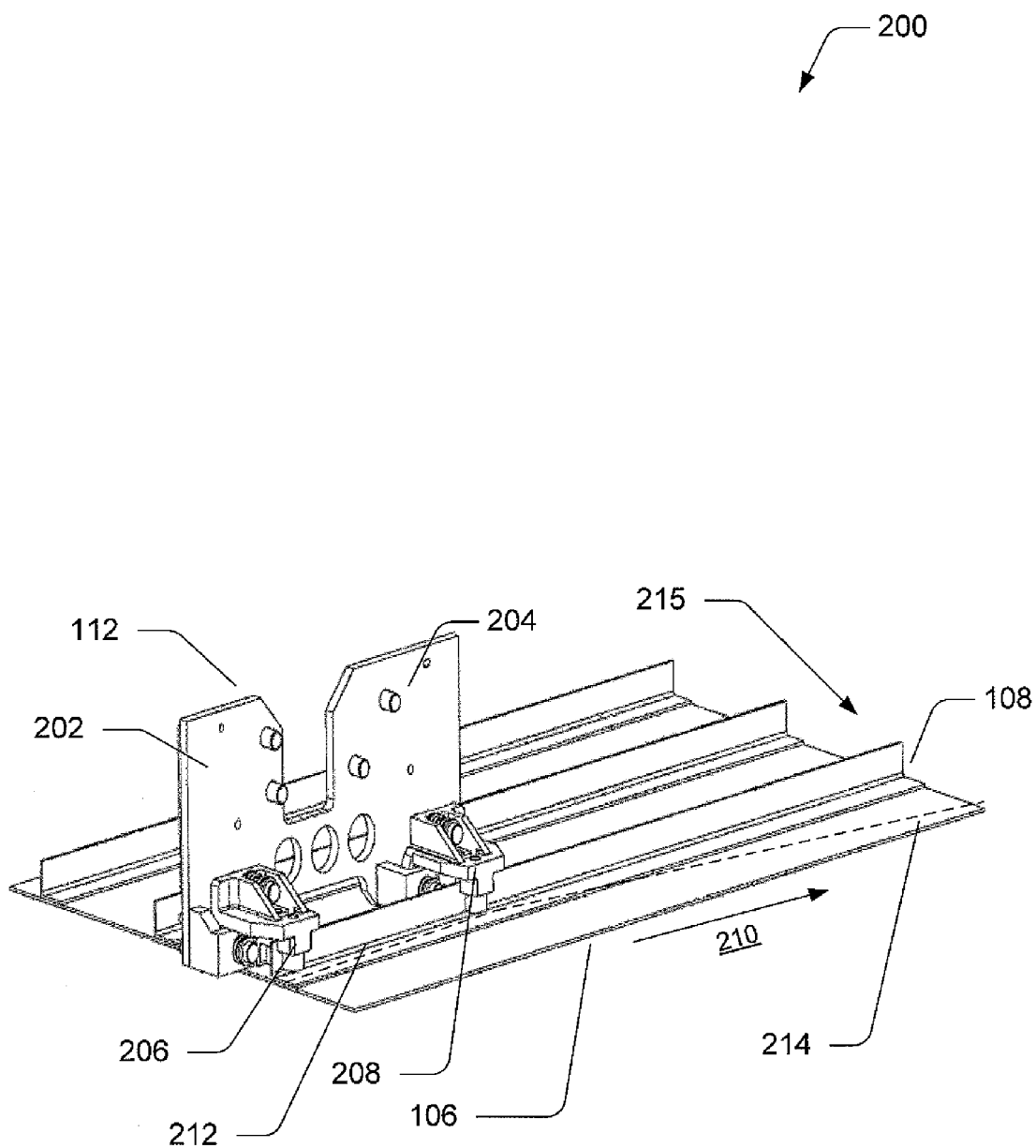
FIG. 2 illustrates a portion of the welding system shown in FIG. 1 with the tooling device removed to expose the positioning device.

FIG. 2 illustrates an implementation 200 showing a portion of the manufacturing system 100 of FIG. 1 with the tooling device 104 removed to expose the positioning device 112. In this embodiment, the positioning device 112 includes a main body 202 and a plurality of mountings 204 disposed on the body 202. The plurality of mountings 204 may be configured to fixedly or removably mount the positioning device 112 to the tooling device 104 of FIG. 1. For instance, the positioning device 112 may be bolted, or similarly fastened via mountings 204. A variety of different tooling devices 104 may be used interchangeably with the positioning device 112 to perform a variety of manufacturing operations, such as riveting, punching, gluing, scoring, bending, cutting, welding, crimping, and any other desired operation. In one or more implementations, rather than being bolted or fastened, the positioning device 112 may be securely fixed to the tooling device 104, such as being welded or integrally-formed to the tooling device 104.

The positioning device 112 also includes one or more securing mechanisms configured to secure and position workpieces relative to the tooling device 104, and along the path of travel of the tooling device 104. (e.g., engagement mechanisms configured to engage and position) For instance, FIG. 2 depicts an implementation having a pair of securing mechanisms 206, 208. In particular, the securing mechanisms 206, 208 are depicted as securing one of the second workpieces 108 at two points along the length of the workpiece 108. In one embodiment, the first workpiece 106 is a molded aluminum skin, such as that of a fuselage of an aircraft, and the plurality of second workpiece 108 are aluminum stringers, such as a T-shaped or angled beams suitable for use within an airframe. The respective work pieces 106, 108 may be joined such as by friction stir welding operations to provide desired structure and characteristics for the formed aircraft fuselage or frame member. A variety of other workpieces or elements are contemplated, including various plates, bars, panels, beams, and any other desired components suitable for forming aircraft frames or assemblies.

In operation, the tooling device 104 and attached positioning device 112 moves along a path, which may be a predefined path controlled via the control system 102 of FIG. 1. An exemplary path 214 is represented by the dashed line in FIG. 2. The securing mechanisms 206, 208 of the positioning device 112 operate to apply clamping force (or other suitable force such as a lateral force, a biasing force, and so forth) to the workpiece 108, thereby aligning the workpiece 108 with the path 214 at successive points as the tooling device 104 moves along the path 214 in a traverse direction 210. For instance, at point 212 along path 214, the workpiece 108 is clamped via the positioning device 112 and the workpiece 108 and the path 214 approximately (or exactly) coincide.

Traveling along the path 214, an exaggerated offset between the path 214 and element 108 is depicted near an end 215 of the element 108. As the assembly reaches the end 215 of the element 108, the clamping or other suitable force applied via the positioning device 112 will shift the workpiece 108 into desired alignment with the path 214. Accordingly, the described offset near the end 215 of the element 108 may be eliminated and proper placement of the workpiece 108 may be achieved. Thus, the positional capability of the tooling assembly itself via applied force of the positioning device 112 is used to secure and position the workpiece 108.

While path 214 is depicted as generally a linear path, it will be appreciated that the techniques described herein may be applied alike to paths which are linear, curvilinear, planar, traverse through multiple planes and so forth. For example, in alternate embodiments, the workpiece 108 may be comprised of a relatively-flexible material (e.g. plastic, rubber, or other elastomeric materials) and the path may be non-linear. In one possible implementation, the workpiece 108 is positioned at the point of the operation (for instance the welding point between securing mechanisms 206, 208) such that the relationship between the workpiece 108 and the path of travel 214 at the point of operation is generally parallel. In other implementations other relationships may be specified, such as a relative angular position between the path of travel 214 and the workpiece 108.

Figure 3:
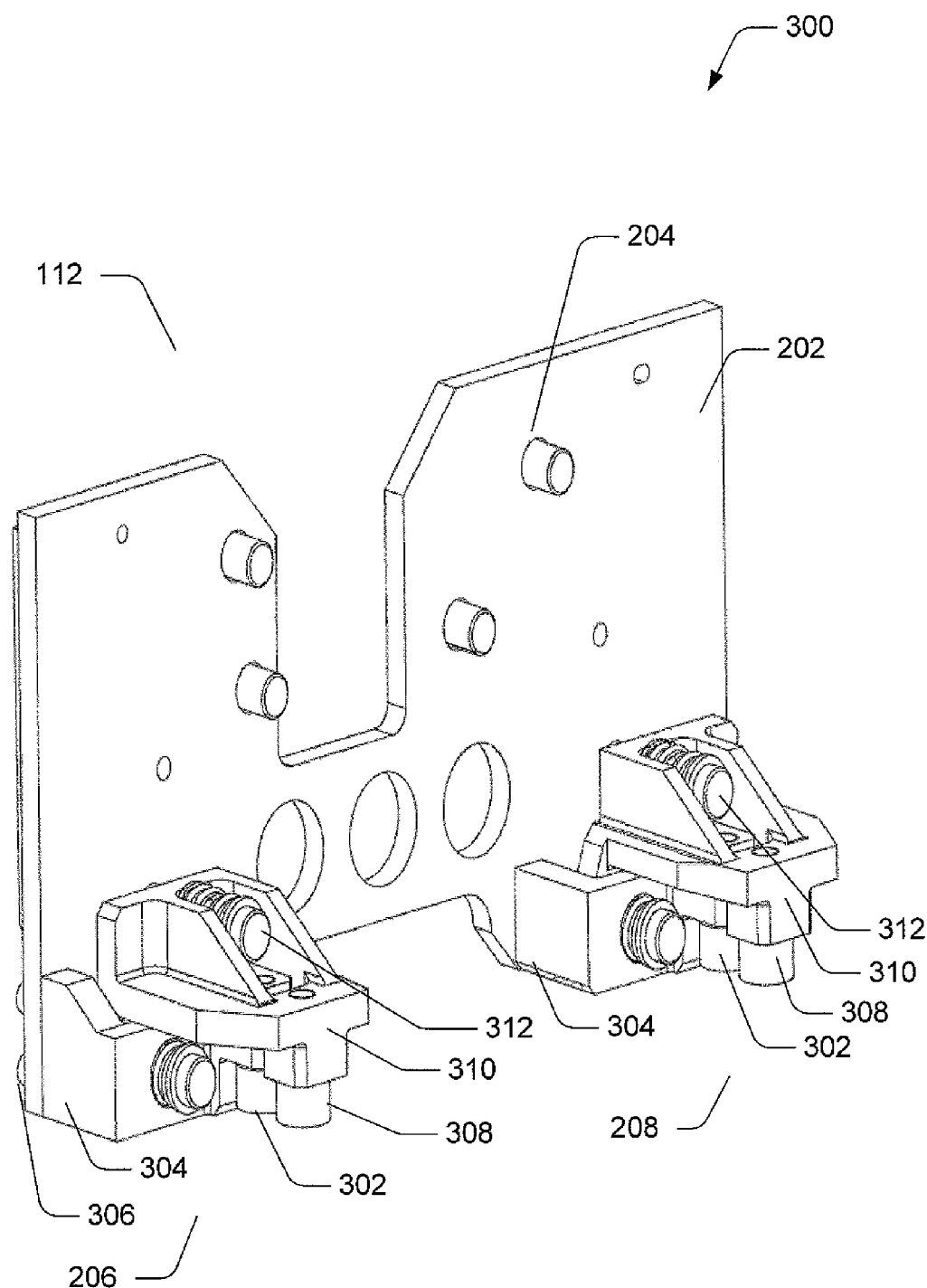
FIG. 3 illustrates a detailed view of an exemplary implementation of the positioning device of FIGS. 1-2.

FIG. 3 is an illustration depicting an implementation 300 of a positioning device 112 of FIGS. 1-2 in greater detail. In particular, detailed aspects of one embodiment of the securing mechanisms 206, 208 of FIG. 2 are depicted. In this implementation, the pair of securing mechanisms 206, 208 are implemented as sets of rollers 302, 308 mounted to the main body 202 of the positioning device 112 via respective mounting brackets 304, 310.

More specifically, in the embodiment shown in FIG. 3, each of the securing mechanisms 206, 208 includes one of a set of locator rollers 302 which are attached to the body 202 of the positioning device 112 via respective brackets 304. The locator roller brackets 304 may be attached via bolts 306 passing through the body 202 or other suitable attachment means. In certain embodiments, the locator roller brackets 304 may be integrally formed or welded to the body 202. Tension rollers 308 corresponding to each of the locator rollers 302 are also depicted as mounted to the body 202 via respective tension roller brackets 310. Preferably, the tension rollers 308 are approximately parallel to the locator rollers 302. A workpiece 108 may accordingly be held between corresponding sets of rollers 302, 308. It may be appreciated that in the described arrangement, a clamping area is formed between rollers 302, 308 at each of the securing mechanisms 206, 208. The rollers 302, 308 engage the workpiece 108 and may apply clamping force in the clamping area. The rollers 302, 308 permit the positioning device 112 to move along an axis of the workpiece 108 (e.g., the positioning device 112 rolls down the workpiece 108), and may simultaneously apply a clamping force to secure and position the workpiece 108.

The locator rollers 302 may be aligned with the tooling device 104 to set a fixed position for a workpiece held between the rollers at the point at which the operation occurs. Thus, the locator rollers 302 may act as a fixed backstop (or positioner or guide) for a secured workpiece. In particular, the position may be fixed relative to the path of travel of the tooling device 104 to which the positioning device 112 is attached, as described more fully below with respect to FIG. 5.

The tension roller brackets 310 may be configured to adjustably provide tension. Each tension roller bracket 310 has one or more corresponding tension adjusters 312, which may be used to vary the tension provided via the rollers 308, and accordingly the clamping force applied to secure and position a workpiece. In the depicted embodiment, the tension adjusters 312 are implemented as spring loaded bolts which secure respective brackets 310 to the body 202 and may be manually adjusted to vary the tension. Naturally, the tension may be adjusted to determine how securely a workpiece is held and how much resistance there will be as the positioning device moves along the path. For instance, the tension may be adjusted to compensate for rollers of different materials having different frictional properties. A variety of hydraulic, pneumatic, mechanical tension adjustments 312 to automatically and/or dynamically adjust the tension may alternatively be employed, further discussion of which may be found in relation to FIG. 6.

In operation, a workpiece may be clamped or pinched between the sets of rollers. The tension provided by the tension rollers 308 adjusts the workpiece position to the position set by the locator rollers 302 as the assembly of the tooling device 104 and positioning device 112 moves along a path. Thus, a workpiece may be secured and positioned for a manufacturing operation (e.g., welding) along a path using the positional capabilities of the tooling device 104 in conjunction with the mountable positioning device 112 presently described. While rollers are described, it is noted that a variety of securing mechanisms may be employed which are suitable to provide securement and positioning of workpieces. For instance, FIG. 6 according to detail below, depicts an implementation in which locating strips are utilized as an alternative to locator rollers 302. A variety of other devices having various types, shapes and materials may be utilized to provide the tension and clamping force for securement and positioning of workpieces, a few examples of which are rubber pads, bars, strips, actuators, spring clamps, ratcheting devices, and any other suitable mechanisms.

Figure 4:
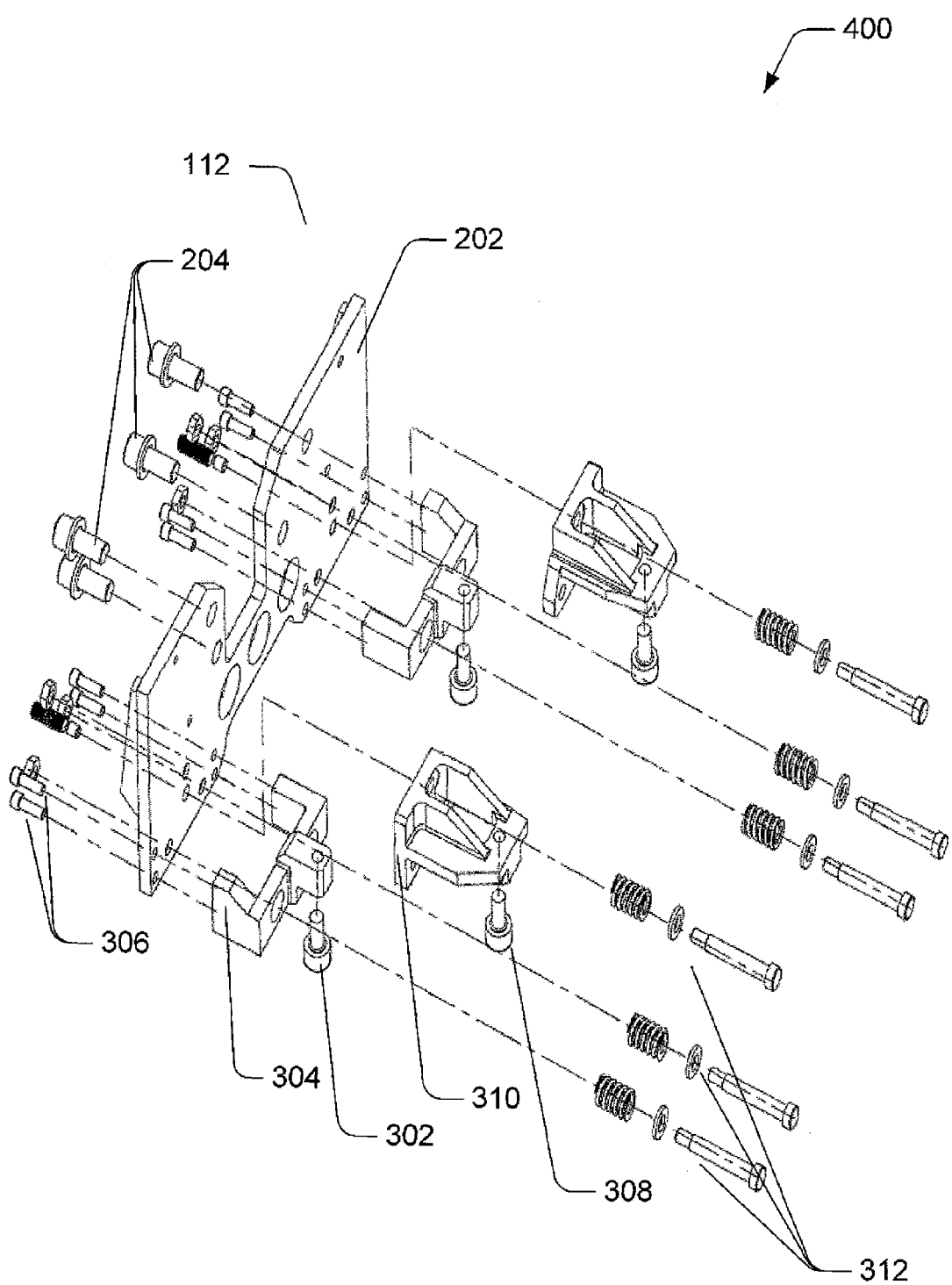
FIG. 4 illustrates an exploded view of the positioning device of FIG. 3

Referring to FIG. 4, an exploded view 400 depicting the assembly of the positioning device 112 of FIG. 3 is provided. In this embodiment, the main body 202 of the positioning device 112 has disposed thereon a plurality of different holes, which may be arranged in various patterns to attach the components of the positioning device 112 to the body 202 via fasteners such as bolts and the like. A plurality of mounting members 204, configured as bolts in this embodiment, are used to secure the positioning device 112 to the tooling device 104. Two sets of locater rollers 302 and tension rollers 308 are depicted which each may be secured to corresponding mounting brackets 304 and 310. The locator roller mounting brackets 304 are secured to the body 202 via a plurality of bolts 306 and corresponding holes in the main body 202. The tension roller brackets 310 are secured to the body via a plurality of tension adjustments 312, which are implemented as spring loaded bolts. In alternate embodiments, fixed fastening methods such as welding, adhesive and the like may also be employed to secure the positioning device 112 to the tooling device 104.

Figure 5:
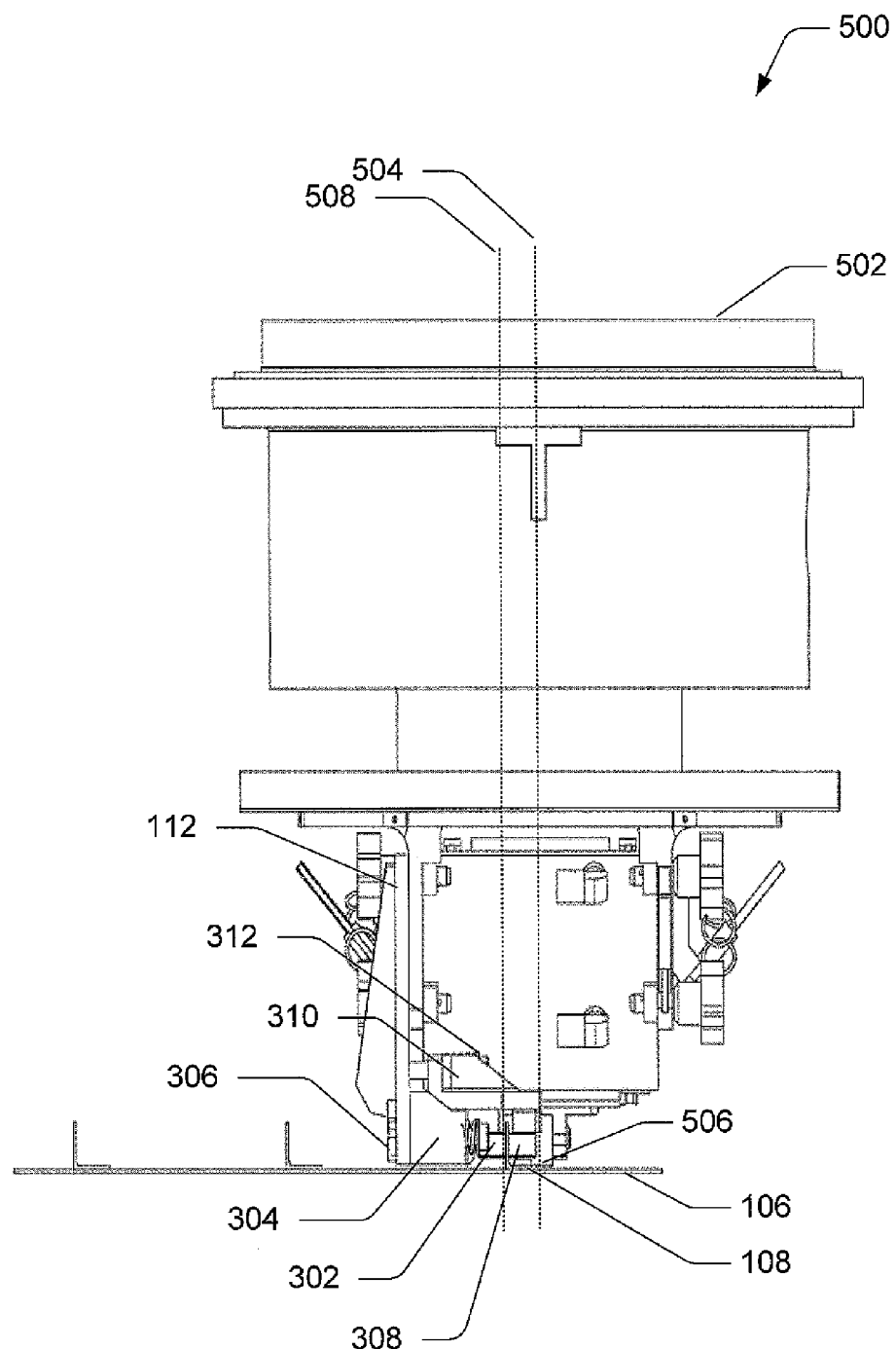
FIG. 5 illustrates edge view of an implementation of the system of FIG. 1 showing the alignment of a positioning device.

FIG. 5 illustrates a side view of the system 100 of FIG. 1 including a positioning device 112 implemented as described with respect to FIG. 3. FIG. 5 illustrates the alignment of the positioning device 112 and correspondingly the workpiece 108 held by the positioning device 112 to the tooling device. In this instance the depicted tooling device is configured as a friction stir welding (FSW) tool 502. The previously described control system 102 may operate to cause the FSW tool 502 to perform welding operations to join the second workpiece 108 to the first workpiece 106. In particular the FSW tool 502 rotates to provide frictional energy at the contact point which plasticizes the workpieces. The plasticized areas of each workpiece 106, 108 form a fluid region which when cooled (e.g., after the FSW tool 502 moves by) fuses the workpieces together (e.g., welds) at the contact point. The centerline of the FSW 502 is depicted by the dashed line 504 and also represents the centerline of the welding operations and accordingly a point on the path of the tool. A contact point 506 on the centerline and the programmed path is depicted which is where the welding occurs.

The second workpiece 108 is depicted as secured between locator roller 302 and tension roller 308 in accordance with the previously described devices and techniques. The positioning device 112 is aligned such that a constant or fixed position 508 for the second workpiece 108 is set and maintained relative to the centerline 504 and contact point 506. In particular, the position 508 corresponds to the position of the one or more locator rollers 302. This position 508 is maintained as the FSW tool 502 traverses a weld path. In one implementation, the workpiece 108 is positioned to be substantially parallel to the programmed path of the weld at the point 506 at which welding occurs. The tension and/or clamping force provided by the positioning device 112 adjusts the workpiece 108 into the set position 508 at successive points along the path. In this case, the position 508 is set to the outside edge of the workpiece 108 which as depicted is an L-shaped angled stringer. A variety of other workpieces, cross-sectional elements, or stringers and so forth may be similarly positioned resulting in corresponding positions 508 which may be set different for different types of elements.

Shims and machine grounding blocks may be utilized to set the desired position of rollers 302 and accordingly the position 508 and to maintain the desired relationship of workpiece to tool and/or workpiece to workpiece.

Figure 6:
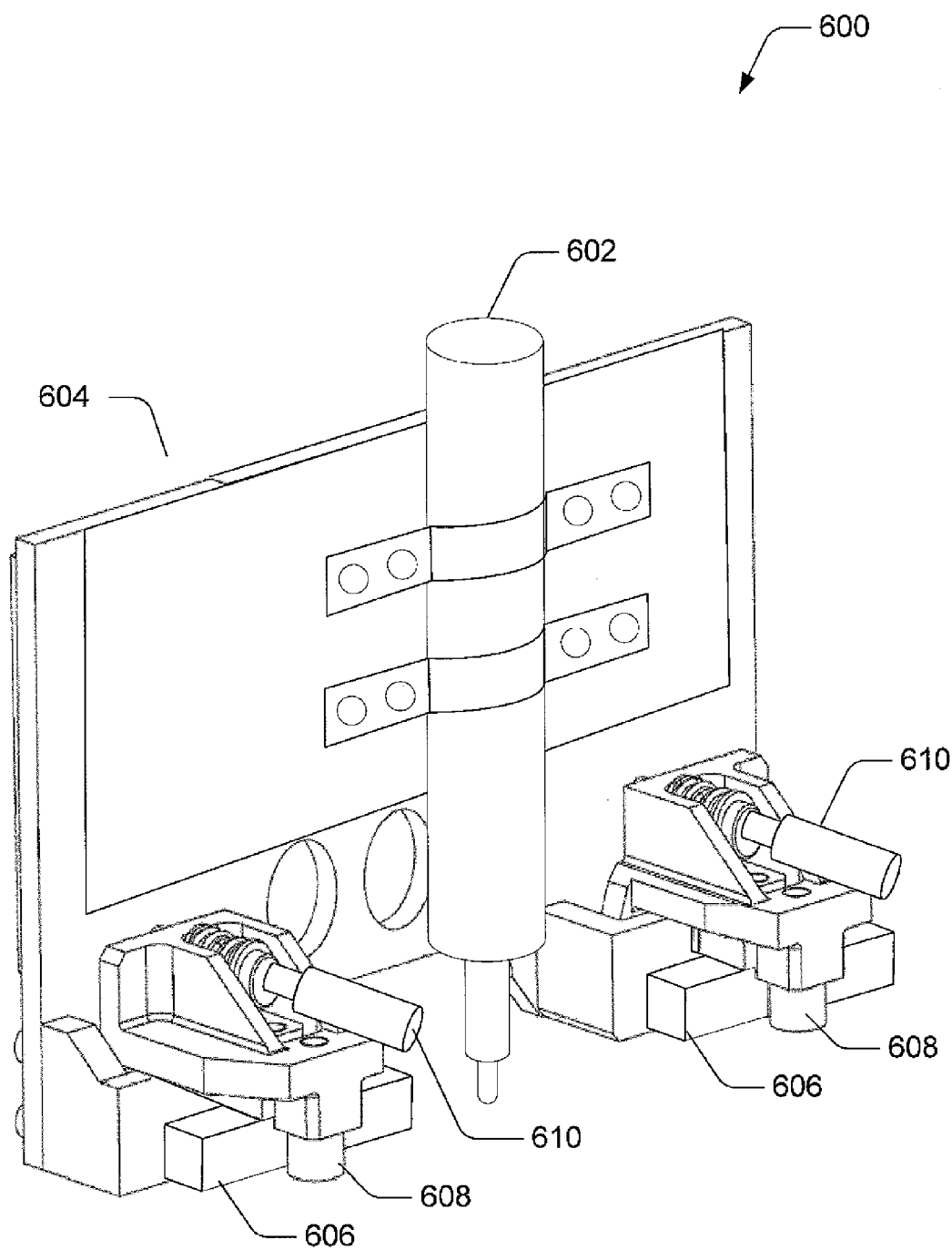
FIG. 6 illustrates another exemplary implementation of a positioning device.

FIG. 6 depicts another implementation 600 of a positioning device 112 in accordance with an alternate embodiment of the invention. As previously described, a variety of tooling operations may be employed with the described devices and techniques and are not limited to the previously described welding techniques. For example, in the implementation 600 of FIG. 6, a tooling device configured as a riveting device 602 is depicted having an attached positioning device 604. The riveting device 602 may be operable to join workpieces together, e.g. by placing rivets along a joint, which again may be a predefined path controlled by the control system 102 of FIG. 1. A workpiece may be secured and positioned as previously described using the features of the positioning device 112.

In the implementation 600, the set position 508 is provided by a set of locator strips 606 rather than the locator rollers 302 previously described. Corresponding tension rollers 608 are depicted arranged approximately parallel to the locator strips 606, thereby forming a clamping region between the strips 606 and rollers 608. While tension rollers 608 are depicted, it is noted that tension strips similar to the locator strips 606 may also be used as an alternative to tensioning rollers 606. A variety of sizes, shapes and types of tension and locator strips 606 may be utilized. For instance, strips 606 may be generally rectangular as depicted in FIG. 6, or may be oval, circular, or any other suitable shape.

While rollers and strips have been described, securing mechanisms may be implemented to include a variety of combinations of locator members and tension members to provide the clamping force. For instance, locator members and tension members configured as rollers, strips, bars, pads, clamps, and so on may be employed. A variety of combinations of locator members and tension members are contemplated which include members of various sizes, types and materials utilized in various combinations for the securing mechanisms.

FIG. 6 further depicts an automated arrangement for tension adjustment of the positioning device 604. More specifically, in this embodiment, the tension rollers 608 are depicted having associated actuators 610. The actuators 610 may be used to automatically and/or dynamically adjust the tension provided via the tension rollers 608. The control system 102 may be communicatively and/or physically coupled to the actuators 610 to control the operation of the actuators 610. Thus, rather than manual adjustments of the tension, the actuators 610 may be used to automatically adjust the tension. Accordingly, the tension and/or clamping force applied to a workpiece may thereby be dynamically controlled, for instance by varying of the force as the tooling device traverses a path. The actuators 610 may be implemented in a variety of ways, for instance via mechanical screws, hydraulic devices, pneumatic devices, and any other suitable actuation methods. A variety of other adjustments of the positioning devices 604 and 112, such as alignment of locator members to the centerline of a tool device 104, FSW head 502, or riveting device 602 may also be automated via control system 102 and associated control devices and logic.

Figure 7:
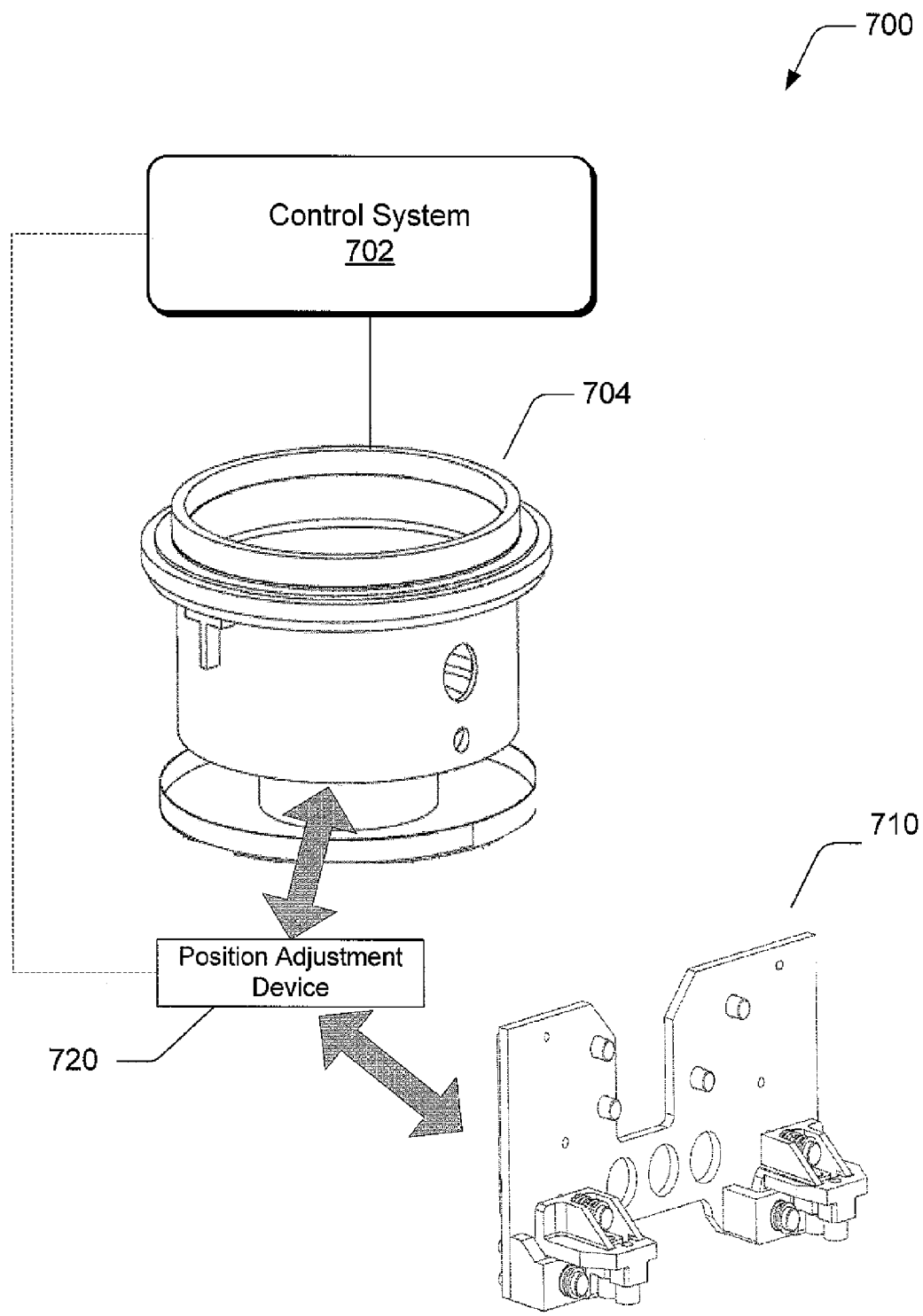
FIG. 7 is a partially-exploded view of a manufacturing system in accordance with an alternate embodiment of the invention.

FIG. 7 is a partially-exploded view of a manufacturing system 700 in accordance with an alternate embodiment of the invention. The structure and operation of several of the components of the manufacturing system 700 may be substantially similar (or identical) to the components described above. Therefore, for the sake of brevity, only significant differences in the structure and operation of the components of the manufacturing system 700 will be described in detail.

As shown in FIG. 7, the manufacturing system 700 includes a positioning assembly 710 operatively coupled to a tool assembly 704 by a position adjustment device 720. The position adjustment device 720 permits the position of the positioning assembly 710 to be adjusted with respect to the tool assembly 704. The position adjustment device 720 may be a manually-actuated device (e.g. using threaded members, clamping members, etc.), or more preferably, may be controllably adjustable using one or more actuation devices (e.g. servomotors, hydraulic or pneumatic actuators, magnetic actuators, etc.) that are controllable using signals from a control system 702. Thus, the position of the positioning assembly 710 may be controllably adjusted during the performance of manufacturing operations using the tool assembly 704, enabling the positioning assembly 710 to better position and secure a workpiece (e.g. the second workpiece 108 of FIG. 1) in a flexible, more adaptable manner, and without requiring costly interruptions of the manufacturing operations to allow for manual adjustments.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. Apparatus for securing a part to a workpiece, the apparatus comprising:
 a moveable tooling device; and
 a positioning device including a body attached to the tooling device and moveable with the tooling device; a locator mechanism, attached to the body, for moving along a side of the part; a biasing mechanism for moving along an opposite side of the part and biasing the part against the locator mechanism; and means for automatically adjusting tension of the biasing mechanism;
 wherein the part is pinched between the mechanisms, and positioned on the workpiece and under the tooling device as the tooling device follows a path on the workpiece.

2. The apparatus according to claim 1, wherein the part is an elongated stringer and the workpiece is a sheet metal skin member of an aircraft fuselage component, and wherein the tooling device performs at least one of welding, riveting, gluing, cutting, scoring, punching, crimping, and bending to join the stringer to the skin.

3. The apparatus according to claim 1, wherein the positioning device further includes a second locator mechanism spaced apart from the first locator mechanism and a second biasing mechanism for moving along the opposite side of the part and biasing the part against the second locator mechanism.

4. The apparatus according to claim 3,
 wherein at least one of the first and second biasing mechanisms further includes an actuator for dynamically controlling the biasing during a manufacturing operation.

5. The assembly of claim 1, wherein the locator mechanism includes a locator roller and the biasing mechanism includes a tension roller arranged to form a clamping region with the locator roller and approximately parallel to a centerline of the tooling device, wherein during a manufacturing operation, the clamping region engages the part along an axis of the part and moves down the axis with movement of the tooling device, applying clamping force at successive points along the axis thereby aligning the part relative to the path.

6. The assembly of claim 5, wherein the tension roller is mounted via one or more tension adjustors, each tension adjustor being controllably adjustable to vary the clamping force applied to the workpiece.

7. The apparatus according to claim 1, wherein the tooling device performs a manufacturing operation at a work location on the workpiece, and wherein the locator mechanism and biasing mechanism are configured to align the workpiece such that the workpiece is positioned approximately parallel to the path at the work location.

8. The apparatus according to claim 1, further comprising a control system, coupled to the tooling device, for controlling movement of the tooling device along the path.

9. The apparatus of claim 1, wherein the locator mechanism includes a roller.

10. The apparatus of claim 1, wherein the locator mechanism includes a strip.

11. An assembly for performing a manufacturing operation on a part and a workpiece, the assembly comprising a moveable tooling device having a tip, and a positioning device for positioning the part on the workpiece under the tip as the tip is moved along a path on the workpiece during a manufacturing operation, the positioning device including:
a plate having a side to which the tooling device is transversely mounted, the tip located at a base of the plate; and
a pinching mechanism including first and second locator members attached to the side of the plate and corresponding first and second biasing members attached to the side of the plate, each biasing member biased towards its corresponding locator member to pinch opposite sides of the part, the locator rollers spaced apart along the base of the plate, the pinching mechanism moving along the part as the tooling device is moved along the workpiece to align the part with respect to the path.

12. The assembly according to claim 11, further comprising actuators operatively coupled to the biasing mechanisms for dynamically controlling pinching force during the manufacturing operation.

13. The assembly according to claim 11, wherein each biasing member includes a tensioning member arranged to oppose the locator member such that a clamping region is formed between the locator and tensioning members and approximately parallel to the path.

14. The assembly according to claim 13, wherein the tensioning member is mounted to the plate via one or more tension adjustors which adjustably produce the clamping force on the part.

15. The assembly according to claim 11, wherein the plate is coupled to the tooling device by a position adjustment device, the position adjustment device being configured to adjust a position of the positioning device relative to the tooling device in response to a control signal during the performance of the manufacturing operation.

16. The assembly of claim 11, wherein the tooling device is a friction stir welding device.

17. The assembly of claim 11, further comprising the part and the workpiece, wherein the workpiece includes aircraft skin and the part includes an aircraft beam having a flange and a web; wherein the pinching mechanism pinches the web while the tooling device attaches the flange to the aircraft skin.

* * * * *